C. J. GARDNER.
HARVESTER.
APPLICATION FILED SEPT. 24, 1917.
1,260,659.
Patented Mar. 26, 1918.
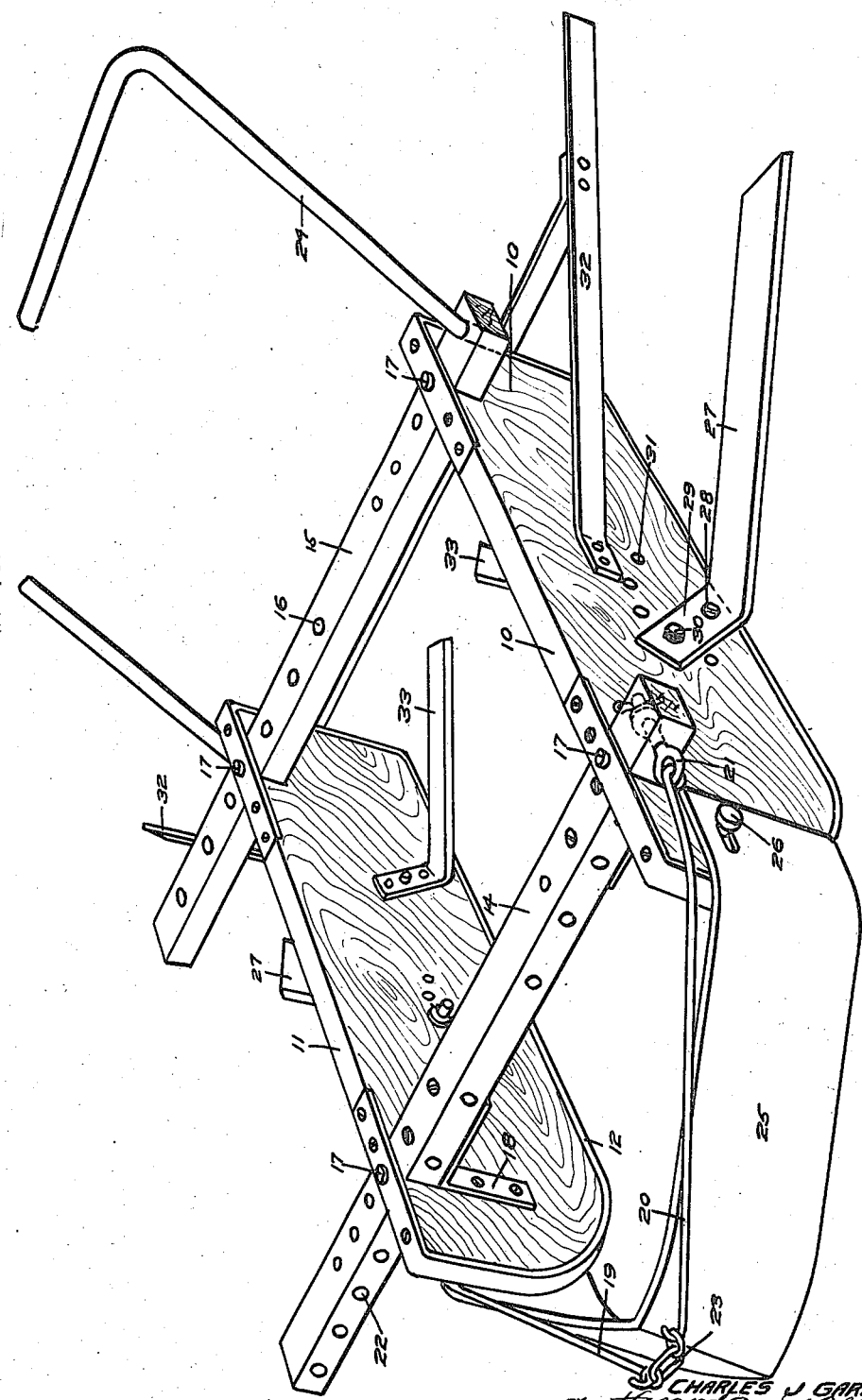

UNITED STATES PATENT OFFICE.

CHARLES J. GARDNER, OF HUNTINGTON BEACH, CALIFORNIA.

HARVESTER.

1,260,659. Specification of Letters Patent. Patented Mar. 26, 1918.

Application filed September 24, 1917. Serial No. 192,966.

*To all whom it may concern:*

Be it known that I, CHARLES J. GARDNER, a subject of the King of Sweden, residing at Huntington Beach, in the county of Orange and State of California, have invented new and useful Improvements in Harvesters, of which the following is a specification.

This invention relates to a harvester.

The principal object of this invention is to provide a simple device by which beans, peas, garlic, grass, and other forms of vegetation may be cut, particularly those plants which are harvested by being cut below the surface of the ground.

Another object of this invention is to provide a harvester which may be easily adapted for use with different forms of vegetation.

Another object of this invention is to provide a harvester which may be drawn along the rows in the field without requiring that the horses drawing the implement will trample the plants.

Other objects will appear hereinafter.

The invention is illustrated, by way of example, in the accompanying drawing in which:

The figure is a view in perspective illustrating the implement as fitted to cut beans and the like.

Referring more particularly to the drawing, 10 and 11 indicate sled runners here shown as formed of wood and having metal wear plates 12 and 13 along their bearing surfaces, said plates being carried upwardly around the noses of the runners, as particularly shown in the drawings. The sled runners are secured in parallel relation to each other by cross bars 14 and 15, these bars being fitted with openings 16 at intervals along their lengths to receive spacing pins 17. The pins 17 extend downwardly through the ends of the wear plates, which have been carried a distance along the upper faces of the runners, and hold the bars and runners in adjustable relation to each other. It will thus be seen that by removing the pins 17 the runners may be separated and that when the pins are again placed in position through the openings 16 the runners will be locked together at a desired distance from each other. Angle plates 18 are secured to the inner faces of the runners and extend beneath the cross bars to form a rigid structure. The front cross bar 14 is also used as a connection for draw rods 19 and 20, the rear ends of which engage eye-bolts 21 secured through horizontally extending openings 22 in the bar 14. The forward ends of the rods are connected by three links 23 which allow equalization of the pull in case the cross bar 14 cannot be set to throw the implement in proper alinement with the row along which it is to travel. A suitable handle 24 is secured to the rear cross bar 15 and by it the implement may be manipulated. It will be understood, however, that when desired a seat may be secured upon the implement for the rider.

When the implement is used for cutting beans, a prow 25 is pivotally secured to the front of the runners upon pins 26. This prow is V-shaped and acts to throw the bean vines at each side of the runners so that the implement may be drawn easily along the rows. Secured at each side of the implement and to the runners are angularly disposed cutting blades 27. These blades extend outwardly and rearwardly from the outer faces of the runners and are so mounted as to normally cut beneath the surface of the ground. These blades are mounted upon pivot bolts 28 in relation to which they may be vertically adjusted by moving an extension 29 along the side of the runners and setting it in relation thereto by placing a pin 30 through an opening in it and through one of a series of registering openings 31 in the runner. This will incline the blades at given angles to the horizontal. Secured to the outer sides of the runners at points in the rear of the blades 27 are piling arms 32 which extend outwardly and rearwardly and gather and form the cut vines into rows at opposite sides of the path of travel along which the implement is drawn.

In case the implement is to be used as a weed cutter, inwardly extending cutting blades 33 are secured to the inner faces of the runners and are held to extend rearwardly and toward each other. These blades will act to cut vegetation from the space between the two runners, as will be readily understood.

In operation, the implement may be readily assembled to cut beans by providing the runners with the blades 27 and the arms 32 as well as the prow 25. After these have been properly secured to the runners the runners may be adjusted in relation to each other along the bars 14 and 15 to space them in proper relation to the rows along which they are to cut.

It will thus be seen that the device here disclosed, while inexpensive in manufacturing cost, may be utilized to effectively cut various forms of vegetation and may be easily adapted for various uses.

I claim:

1. An agricultural implement comprising a pair of runners secured in parallel relation to each other, cutter blades secured to the sides of and in angular relation to the runners, angularly extending piling arms secured to the runners and adapted to form piles of the material cut by the blades along the path of travel of the implement, means whereby the runners may be adjusted in relation to each other, and means whereby the cutter blades may be disposed at various angles to the horizontal.

2. An agricultural implement comprising a pair of runners secured in parallel relation to each other, cutter blades secured to the sides of and in angular relation to the runners, angularly extending piling arms secured to the runners and adapted to form piles of the material cut by the blades along the path of travel of the implement, means whereby the runners may be adjusted in relation to each other, means whereby the cutter blades may be disposed at various angles to the horizontal, and a prow detachably secured at the forward ends of the runners to separate the material to be cut and throw it into the paths of travel of the cutter blades.

3. An agricultural implement comprising a pair of runners secured in parallel relation to each other, cutter blades secured to the sides of and in angular relation to the runners, angularly extending piling arms secured to the runners and adapted to form piles of the material cut by the blades along the path of travel of the implement, means whereby the runners may be adjusted in relation to each other, means whereby the cutter blades may be disposed at various angles to the horizontal, a prow detachably secured at the forward ends of the runners to separate the material to be cut and throw it into the paths of travel of the cutter blades, and draw rods disposed at the forward ends of the runners.

4. An agricultural implement comprising a pair of runners secured in parallel relation to each other, cutter blades secured to the sides of and in angular relation to the runners, angularly extending piling arms secured to the runners and adapted to form piles of the material cut by the blades along the path of travel of the implement, means whereby the runners may be adjusted in relation to each other, means whereby the cutter blades may be disposed at various angles to the horizontal, a prow detachably secured at the forward ends of the runners to separate the material to be cut and throw it into the paths of travel of the cutter blades, draw rods disposed at the forward ends of the runners, and weed cutting blades detachably secured to the runners.

In testimony whereof I have signed my name to this specification.

CHARLES J. GARDNER.